(12) United States Patent
Achtner

(10) Patent No.: US 6,337,789 B1
(45) Date of Patent: Jan. 8, 2002

(54) SPARK GAP ASSEMBLY FOR WELDING POWER SUPPLY

(75) Inventor: Richard Mark Achtner, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/478,165

(22) Filed: Jan. 5, 2000

(51) Int. Cl.$^7$ ................................................ H02H 1/00
(52) U.S. Cl. .................... 361/117; 361/131; 219/124.02
(58) Field of Search ............................. 219/137, 121.11, 219/124.13, 124.02, 124.03; 315/39; 228/34, 234.3; 361/117, 129, 130, 131, 134

(56) References Cited

U.S. PATENT DOCUMENTS

| | | | |
|---|---|---|---|
| 2,886,737 A | 5/1959 | Fruengel | 313/311 |
| 4,104,558 A | 8/1978 | Proud, Jr. et al. | 307/106 |
| 4,879,452 A | 11/1989 | Kovarik et al. | 219/130.4 |
| 5,533,662 A | * 7/1996 | Stidham | 228/34 |

* cited by examiner

Primary Examiner—Jessica Han
(74) Attorney, Agent, or Firm—George R. Corrigan

(57) ABSTRACT

A spark gap assembly includes two conductive spark gap points forming a spark gap. Two substantially identical, non-conductive, molded plastic pieces are clamped together to make a housing with at least one cylindrical receptacle for the spark gap points. Two conductive leads electrically contact the spark gap points and abut and electrically contact circuit board leads when the assembly is mounted on a circuit board. The housing pieces include at least one fastening hole and a fastener extends through the fastening holes when the pieces are assembled, thus clamping the together. The two pieces have at projections on the bottom that are received in holes on the board, thereby positioning the pieces.

20 Claims, 2 Drawing Sheets

SPARK GAP ASSEMBLY FOR WELDING POWER SUPPLY

FIELD OF THE INVENTION

The present invention relates generally to the art of welding power supplies having high frequency (HF) arc starters and/or stabilizers. More specifically, it relates to a spark gap assembly used in producing a high frequency signal in a welding, cutting or induction power supply.

BACKGROUND OF THE INVENTION

Arc welding is a process where the arc is often more difficult to start than to maintain. Also, in processes where the arc polarity periodically reverses, the arc is sometimes rectified (extinguished) during the polarity reversals. Accordingly, many prior art systems provide for arc starting and arc stabilizing.

One prior art arc starting and stabilization technique includes providing high voltage at a low current and a high frequency (RF e.g.), to start and stabilize (reignite on a half cycle basis) the arc because high frequency, low current, high voltage will not cause dangerous electrical shocks to the operator.

When high frequency is used only for starting it is called starting high frequency, and is disabled or not used after the arc has been started. Such systems often provide the high frequency voltage when the trigger on the welding torch is initially pulled until welding current is established. Systems which provide high frequency for arc stabilization may provide high frequency continuously, or on demand—i.e. only when the arc is rectified.

There are a variety of devices used to create the high frequency signal used for starting or stabilizing the arc. Typically, a spark gap is provided, and the high frequency signal is created by an arc periodically jumping the gap. When the gap is jumped, a sufficient burst of energy to start or stabilize the art is provided.

A spark gap is created by two electrical points being held a fixed distance apart. The assembly that holds the points in their proper position is called a spark gap assembly. A spark gap point, as used herein, includes the "points" or flat surfaces between which a spark arcs, preferably the head of a cylinder, but it can be other shapes and can include the entire cylindrical (or other shaped) body. A spark gap, as used herein, is the gap across which the spark arcs, and is between the points. A spark gap assembly can include the plastic housing, leads, points, screws and other fasteners which hold together or hold in place the housing.

One prior art spark gap assembly, available on the Miller Dynasty™ welding power supply, included a plastic housing holding the electrical points. The points were cylindrically shaped and connected to a printed circuit board (pcb) by wire leads, one extending from each point and soldered to the circuit board. The position of the points, and thus the length of the gap their between, was adjusted by loosening a screw and then sliding a cylinder. While adequate, this prior art assembly had several drawbacks. First, it was relatively difficult to attach the spark gap points to the circuit board—it required soldering, which can be a time-consuming procedure, and is prone to error. Also, the single piece used to form the spark gap housing was relatively expensive.

Another prior art design provided a housing with leads at the bottom of the housing, and held against the pcb, thus making contact. The position of the points, and thus the length of the gap their between, was adjusted by loosening a screw and then turning a cylinder, which was threaded. This prior art assembly has several drawbacks. First, it was not easy to adjust the gap distance because it required turning the threaded point after loosening several screws which clamped the points in position. Also, it was a relatively expensive housing to make.

Yet another prior art design provided two separate housings, each holding a point. A plurality of fins were provided on the housings to dissipate energy created when the spark jumped across the gap. The leads from each point were at the bottom of each housing, and held against the pcb, thus making contact. However, the gap was created by proper positioning of the two housings when they were mounted on the board, and thus mounting and proper gap sizing was a difficult task.

Accordingly, a spark gap assembly that is easily manufactured is desirable. Such an assembly preferably allows for easy adjustment of the gap, and for easy electrical connection to the pcb.

SUMMARY OF THE PRESENT INVENTION

According to a first aspect of the invention a spark gap assembly for a welding power supply includes two conductive spark gap points, positioned to have a spark gap created therebetween. A non-conductive housing is made of two pieces of molded plastic that are clamped together. The housing has at least one receptacle for the spark gap points. Two leads, both conductive are disposed to electrically contact the spark gap points when they are in the receptacle. The leads further abut and electrically contact board leads when the assembly is mounted on a board.

The first and second pieces are substantially identical and, when assembled, abut one another along a surface generally extending in a first direction in one alternative.

Each housing piece defines half of each of two receptacles, and when the pieces are assembled, the halves of the receptacles mate to form the two receptacles, and the first and second receptacles have a generally cylindrical shape in other alternatives. Also, the two housing pieces, when assembled, may define a spark gap channel therethrough, and the spark gap channel is the receptacle.

Each lead is disposed about a portion of the periphery of a receptacle, and extends to the bottom of the assembly, and when assembled, the leads each have a bottom portion parallel to the bottom of the assembly, and the bottom portions include a cut-out disposed to have a fastener pass therethrough, to help fasten the assembly to the board in various alternatives.

The housing pieces each include at least one fastening hole extending in a direction generally perpendicular to the spark gap channel and a fastener extends through the fastening holes when the pieces are assembled, thus holding the first and second pieces in a clamped relationship in an alternative embodiment in other alternatives. The spark gap points are shaped to fit securely in the receptacles, such that when the pieces are clamped together the spark gap points are held securely in the receptacles. The leads extends receptacles, between the pieces, to the bottom of the assembly. The fastener may be a bolt and a nut.

The first and second piece each have at least one projection on the bottom, and each projection is received in one of a plurality of holes on the board, thereby positioning the first piece and the second piece, and/or the housing pieces define at least one hole therethrough, extending in a direction perpendicular to the bottom, to receive a fastener and to hold the assembly to the board in more alternatives.

Other principal features and advantages of the invention will become apparent to those skilled in the art upon review of the following drawings, the detailed description and the appended claims.

Figure 1:
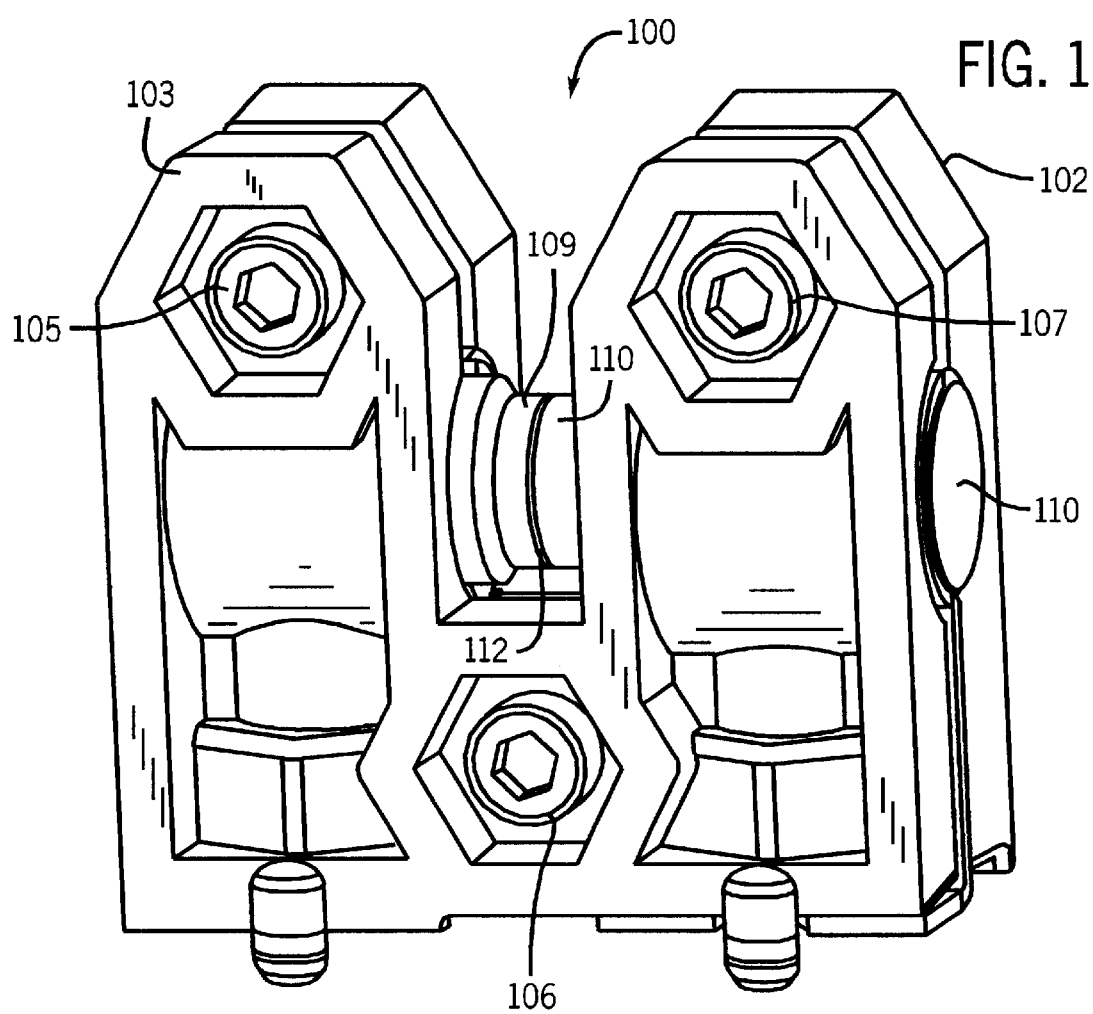
FIG. 1 is a perspective view of a spark gap assembly constructed in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular spark gap assembly with particular preferred features used in a welding environment, it should be understood at the outset that the invention can also be implemented with other particular features, and used in other environments, including plasma cutting, induction heating, or other high power applications.

Figure 3:
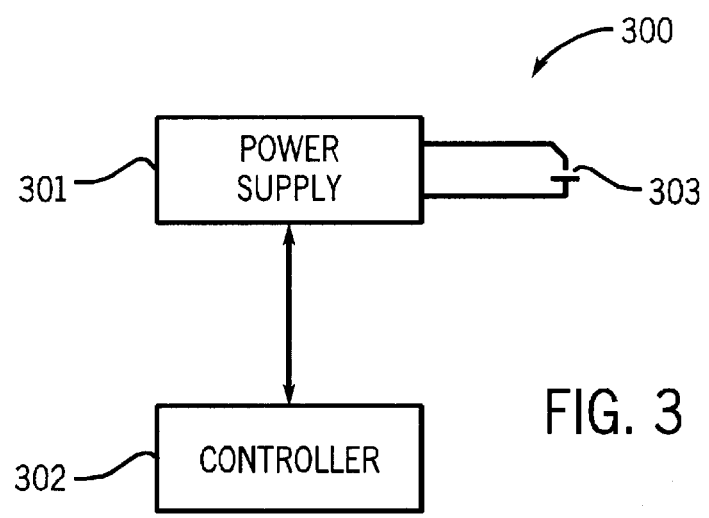
FIG. 3 is a block diagram of a welding system using the spark gap assembly of FIGS. 1 and 2.
Figure 2:
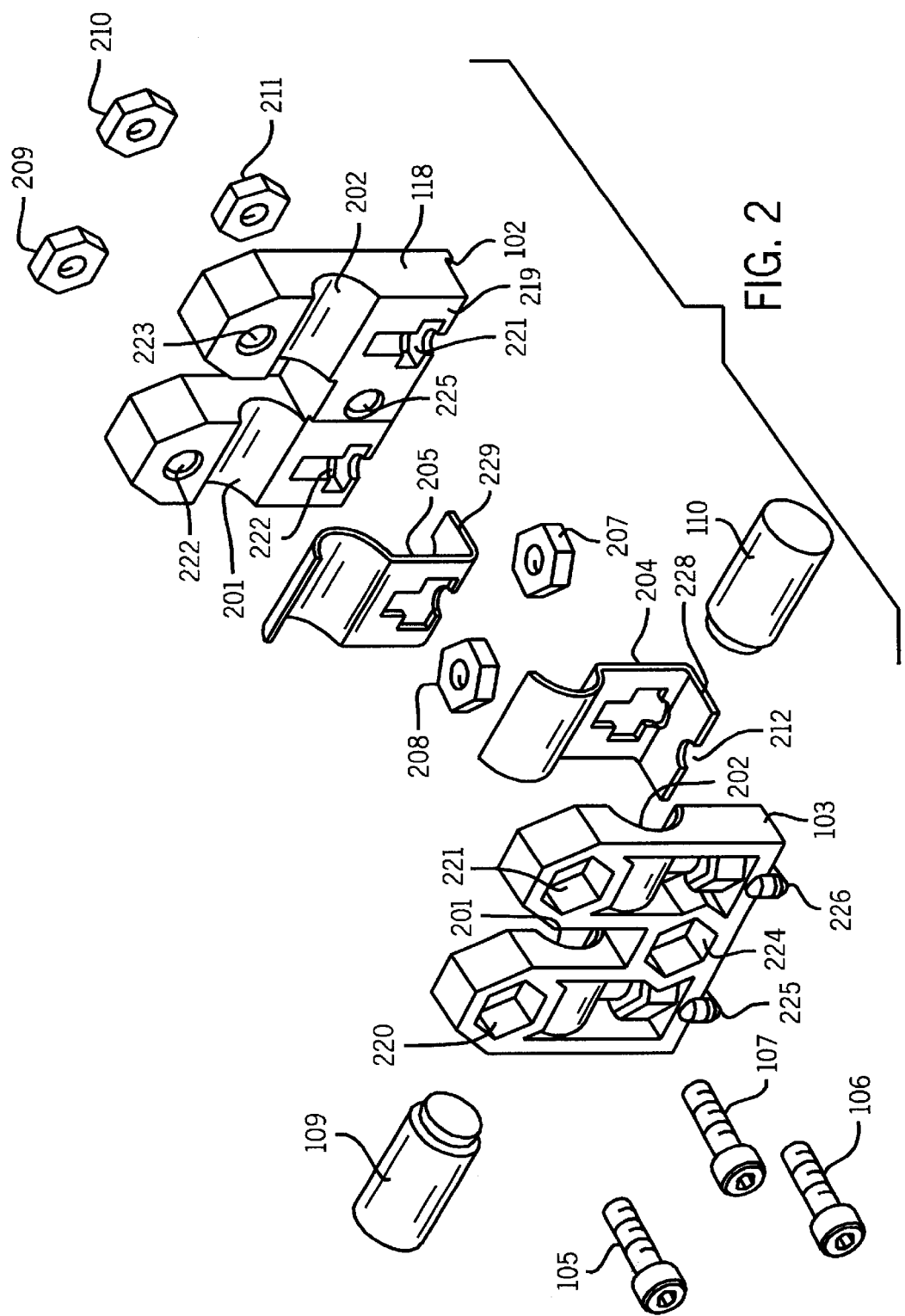
FIG. 2 is an exploded view of the spark gap assembly of FIG. 1.

FIG. 1 is a perspective view of a spark gap assembly 100 and shows two housing pieces 102 and 103, three socket head bolts 105, 106 and 107, a pair of spark gap points 109 and 110, with a spark gap 112 formed therebetween. FIG. 2 is an exploded view and further shows a pair of receptacles 201 and 202 formed as part of a pair of housing pieces 102 and 103, a plurality of nuts 207–211. FIG. 3 is a block diagram of w welding system 300, including a power supply 301, a controller 302, and a torch 303. Controller 302 includes a pcb with a spark gap assembly 100 such as that shown in FIGS. 1 and 2. The following description will be made with respect to these drawings.

Housing pieces 102 and 103 together form a spark gap housing (i.e., the structure that houses the points). Specifically, receptacles 201 and 202 are half-cylindrical openings, such that when housing pieces 102 and 103 are assembled to form the complete housing, cylindrical spark gap receptacles are formed. Receptacle, as used herein, includes the portion of the housing in which the points and/or leads reside. The receptacle and the gap therebetween form a spark gap channel, which extends in a direction perpendicular to a face 118 of housing piece 102.

Leads 204 and 205 include a curved portion to fit within receptacles 201 and 202, and to make contact with points 109 and 110. Lead, as used herein, includes the electrically conductive elements in the assembly that form part of the complete circuit when the spark arcs across the gap. Leads 204 and 205 extend downward to the bottom of housing pieces 102 and 103 and include an angle or bottom portion 228 and 229 shaped to fit under the bottom of a housing piece. A notch 212 is included in portions 228 and 229 to allow a bolt to pass therethrough to help fix the assembly to the circuit board, and to make electrical contact therewith (described in greater detail below). Board, as used herein, refers to the device to which the assembly is mounted, and includes PCBs, circuit boards, heat sinks, etc.

Housing pieces 102 and 103 are preferably made from molded plastic (plastic made by injection molding, extrusion, or compression molding e.g.), and are preferably identical, so that they can be formed from the same mold. While pieces 102 and 103 are identical (substantially the same, given tolerances etc.), when assembled they are oriented as mirror images to one another.

Spark gap assembly 100 is assembled by placing the curved portion of lead 204 in receptacle 201 and the curved portion of lead 205 in receptacle 202. A face 219 of housing piece 102 is mated with its mirror image of piece 103, thus forming the spark gap channel. The surface of face 219 is said to generally extend in the direction of the plane of the face, i.e. perpendicular to the plane of face 118. Thus, leads 204 and 205 are disposed about a portion of the periphery of their respective of the receptacles (i.e., the inner surface of the housing that forms the receptacle). Also, nuts 207 and 208 are placed in a cut-out portion 221 and 222 of housing pieces 102 and 103, near the bottom of assembly 100 (the bottom of the assembly is the surface on the pcb). A cut-out portion may be a complete hole, or an edge cut away. Cut-outs 221 and 222 form, in the preferred embodiment, a hexagonal cut-out, perpendicular to the bottom, that prevents the nut sitting therein from turning.

Points 109 and 110 are placed in the channel, with an approximate gap between them. The assembly is held together with bolts 105 and 107, which extend through holes 220–225, and are held in place with nuts 209–211. Holes 220–225 may include a fitted or threaded receptacle to hold the nut or bolt head in place, or to replace nuts 209–211.

The spark gap distance is adjusted by sliding points 109 and 110 toward or away from one another. When the correct gap is obtained, bolts 105 and 107 are tightened, thereby tightening the fit about points 109 and 110, thus holding them in place. Accordingly, housing pieces 102 and 103 are said to be in a clamped relationship, i.e., fixedly held together by bolts, fasteners, glue, etc.

Spark gap assembly 100 is thus assembled, and ready to affixed to a pcb. Nuts 207 and 208 receive, in the preferred embodiment, a bolt extending up from the pcb, through cut-out 212. The bolt is tightened, thus affixing and holding the assembly in place. Protrusions 225 and 226 fit in holes or notches in the pcb, thus helping to secure and position spark gap assembly 100 in the desired position.

Also, when spark gap assembly 100 is held in the desired position, each of flat portions 228 and 229 of leads 204 and 205 is pressed against a circuit board lead (which provides power from the circuit board to the points) on the pcb. Leads 204 and 205 thus abut and electrically contact the circuit board leads. Abut and electrically contact, as used herein, includes making sufficient electrical contact to complete the circuit and carry power for the spark, and doing so by physical abutment, without soldering.

Cooling fins are not provided in the preferred embodiment because the design provides for sufficient cooling, particularly when used in a welding system that does not provide continuous HF. Cooling fins are provided in alternative embodiments where greater cooling is required, such as when continuous HF is provided.

The design described above is thus easy to manufacture because it includes a single mold (used for two pieces), it is easily assembled, the gap may be adjusted by sliding (rather than threading) the points, and soldering is not required to connect the leads to the pcb.

Numerous modifications may be made to the present invention which still fall within the intended scope hereof. Thus, it should be apparent that there has been provided in accordance with the present invention a spark gap assembly that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A spark gap assembly for a welding power supply comprising:
    a conductive first spark gap point;
    a conductive second spark gap point, wherein a spark gap is created between the first and second spark gap points;
    a non-conductive housing, comprised of first and second pieces of molded plastic in a clamped relationship, and having at least one receptacle for the first and second spark gap points;
    a conductive first lead disposed to electrically contact the first electrical spark gap point when the first electrical spark gap point is disposed within the at least one receptacle, wherein the first lead is further disposed to abut and electrically contact a first board lead when the assembly is mounted on a board; and
    a conductive second lead disposed to electrically contact the second electrical spark gap point when the second electrical spark gap point is disposed within the at least one receptacle, wherein the second lead is further disposed to abut and electrically contact a second board lead when the assembly is mounted on the board.

2. The assembly of claim 1 wherein the first and second pieces are substantially identical and, when assembled, abut one another along a surface generally extending in a first direction.

3. The assembly of claim 2 wherein the first piece defines half of a first receptacle and half of a second receptacle, and further wherein the first and second pieces are assembled to mate the halves of the first receptacle to form the first receptacle and to mate the halves of the second receptacle to form the second receptacle.

4. The assembly of claim 3 wherein the first and second pieces, when assembled, define a spark gap channel therethrough, extending in the first direction, and wherein the spark gap channel is the at least one receptacle.

5. The assembly of claim 3 wherein the first lead is disposed about a portion of the periphery of the first receptacle and extends to a bottom of the assembly, and the second lead is disposed about a portion of the periphery of the second receptacle and extends to the bottom of the assembly.

6. The assembly of claim 5 wherein, when assembled, the first and second leads each have a bottom portion parallel to the bottom of the assembly, and the bottom portions include a cut-out disposed to have a fastener pass therethrough, to help fasten the assembly to the board.

7. The assembly of claim 6 wherein the first and second receptacles have a generally cylindrical shape.

8. The assembly of claim 7:
    wherein the first and second piece each include at least one fastening hole extending in a direction generally perpendicular to the first direction;
    further including a fastener, extending through the fastening hole of the first piece and the fastening hole of the second piece when the first and second pieces are assembled, holding the first and second pieces in a clamped relationship; and
    wherein the first and second spark gap points are shaped to fit securely in the first and second receptacles, whereby when the first and second pieces are in a clamped relationship the first and second spark gap points are held securely in the first and second receptacles, and the second lead extends from the second receptacle, between the first and second pieces, to the bottom of the assembly.

9. The assembly of claim 8 wherein the fastener is a bolt and a nut.

10. The assembly of claim 7, wherein the first and second piece define at least one hole therethrough, extending in a direction perpendicular to the bottom, such that the at least one hole receives a fastener to affix the assembly to the board.

11. The assembly of claim 7, wherein the first and second piece each have at least one projection on the bottom, and wherein each projection is received in one of a plurality of holes on the board, thereby positioning the first piece and the second piece.

12. The assembly of claim 6:
    wherein the first and second piece each include a plurality of fastening holes extending in a direction generally perpendicular to a direction in which the first and second receptacles extend;
    further including a plurality of bolts, each extending through a fastening hole of the first piece and a fastening hole of the second piece when the first and second pieces are assembled, and a plurality of nuts, each threadedly attached to a bolt, thereby holding the first and second pieces in a clamped relationship; and wherein the first and second spark gap points are shaped to fit securely in the first and second receptacles, whereby when the first and second pieces are in a clamped relationship the first and second spark gap points are held securely in the first and second receptacles.

13. A spark gap assembly for a welding power supply comprising:

a conductive first spark gap point;

a conductive second spark gap point, wherein a spark gap is created between the first and second spark gap points;

means for housing the first and second spark gap points, wherein the means for housing includes nonconductive first and second pieces of molded plastic in a fixed relationship;

first lead means for electrically connecting the first electrical spark gap point to a first board lead when the assembly is mounted on a board; and second lead means for electrically connecting the second spark gap point to a second board lead when the assembly is mounted on a board.

14. The assembly of claim 13 wherein the first and second pieces are substantially identical and, when assembled, abut one another along a surface generally extending in a first direction.

15. The assembly of claim 14 wherein the first piece defines half of a means for holding the first spark gap point and half of a means for holding the second spark gap point.

16. The assembly of claim 15 wherein the first lead means is disposed about a portion of the periphery of the means for holding the first spark gap point and extends to a bottom of the assembly, and the second lead means is disposed about a portion of the periphery of the means for holding the second spark gap point and extends to a bottom of the assembly.

17. The assembly of claim 16 wherein, when assembled, the first and second leads include means for fastening the assembly to the board.

18. The assembly of claim 17 including means for fastening the first piece to the second piece.

19. The assembly of claim 17, wherein the first and second piece each have at least one means for positioning the first piece and the second piece.

20. The assembly of claim 17, wherein the assembly includes means for securing the assembly to the board.

* * * * *